US012683461B2

(12) United States Patent
Aritani

(10) Patent No.: US 12,683,461 B2
(45) Date of Patent: Jul. 14, 2026

(54) PINION-EQUIPPED MOTOR AND GEAR MECHANISM PROVIDED WITH PINION-EQUIPPED MOTOR

(71) Applicant: FANUC CORPORATION, Yamanashi (JP)

(72) Inventor: Takuya Aritani, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 214 days.

(21) Appl. No.: 18/693,272

(22) PCT Filed: Nov. 12, 2021

(86) PCT No.: PCT/JP2021/041760
§ 371 (c)(1),
(2) Date: Mar. 19, 2024

(87) PCT Pub. No.: WO2023/084743
PCT Pub. Date: May 19, 2023

(65) Prior Publication Data
US 2024/0291351 A1      Aug. 29, 2024

(51) Int. Cl.
*H02K 7/116* (2006.01)
*H02K 7/00* (2006.01)
*H02K 7/08* (2006.01)

(52) U.S. Cl.
CPC ............. *H02K 7/116* (2013.01); *H02K 7/003* (2013.01); *H02K 7/08* (2013.01)

(58) Field of Classification Search
CPC .......... H02K 7/116; H02K 7/003; H02K 7/08; F16H 55/17

USPC .......................................................... 310/83
See application file for complete search history.

(56) References Cited

FOREIGN PATENT DOCUMENTS

| JP | S60-129542 U | 8/1985 |
| JP | H11-247875 A | 9/1999 |
| JP | 2002-021984 A | 1/2002 |
| JP | 2014149013 A * | 8/2014 |

(Continued)

OTHER PUBLICATIONS

JP2015102221A English translation (Year: 2025).*

(Continued)

*Primary Examiner* — Christopher M Koehler
*Assistant Examiner* — Viswanathan Subramanian
(74) *Attorney, Agent, or Firm* — Studebaker Brackett PLLC

(57) ABSTRACT

The present invention can provide a pinion-equipped motor that has a shaft provided with a pinion having a perfect tooth shape portion functioning as a gear, wherein to shorten the length of the pinion in the axial direction, the perfect tooth shape portion of the pinion can be offset to the proximal side of the shaft. In this pinion-equipped motor that has a shaft provided with a pinion on the distal side, the pinion has: a base portion that is mounted on the shaft; a perfect tooth shape portion that has an outer diameter equal to or smaller than that of the shaft and functions as a gear; and an imperfect tooth shape portion which is provided between the base portion and the perfect tooth shape portion, the length in the shaft axial direction of which is equal to or smaller than that of the perfect tooth shape portion in said direction, and which does not function as a gear.

6 Claims, 10 Drawing Sheets

(56)         References Cited

FOREIGN PATENT DOCUMENTS

| JP | 2015-102221 | A | 6/2015 |
| TW | 201520453 | A | 6/2015 |

OTHER PUBLICATIONS

JP2014149013A English translation (Year: 2025).*
International Search Report issued in PCT/JP2021/041760; mailed
Jan. 25, 2022.

* cited by examiner

FIG. 7

PINION-EQUIPPED MOTOR AND GEAR MECHANISM PROVIDED WITH PINION-EQUIPPED MOTOR

TECHNICAL FIELD

The present invention relates to a pinion-equipped motor and a gear mechanism provided with the same.

BACKGROUND ART

Patent Document 1 identified below discloses a deceleration device that is used together with a motor. A power of the motor is input to the deceleration device via an input shaft. The input shaft has a pinion, a motor-side end portion that has a motor shaft insertion hole, and a part between the pinion and the motor-side end portion (an imperfect tooth shape portion that does not function as a gear).

Patent Document 1: Japanese Unexamined Patent Application, Publication No. 2015-102221

DISCLOSURE OF THE INVENTION

Problems to be Solved by the Invention

Since the input shaft is a member that is attached to the motor shaft in order to input the power of the motor to the deceleration device, it is impractical to design the input shaft to have a very large length in an axial direction. Also, in a case where the outer diameter of the pinion is smaller than the outer diameter of the motor shaft, if a portion between a stepped portion, which is located between the perfect tooth shape portion and the motor-side end portion, and a sweep-out part of the pinion has a small length, the strength of the input shaft is degraded. Therefore, in the related art, the axial length of the imperfect tooth shape portion, which does not function as a gear, is greater than the axial length of the pinion, which functions as a gear.

In this case, the projecting length of the input shaft from the motor shaft increases, which leads to an increase in size of the motor to which the input shaft is attached. As a result, in the mechanism including the motor and the deceleration device, a larger space is required for disposition of the motor, and the entire mechanism increases in size accordingly. Thus, it is desired to offset the pinion of the input shaft on a proximal side of the motor shaft in order to shorten the axial length of the input shaft.

Means for Solving the Problems

An aspect of the present disclosure is a pinion-equipped motor including: a shaft provided with a pinion at a distal end portion, in which the pinion has a base portion that is mounted on the shaft, a perfect tooth shape portion that has an outer diameter equal to or smaller than an outer diameter of the shaft and functions as a gear, and an imperfect tooth shape portion which is provided between the base portion and the perfect tooth shape portion, a length in the shaft axial direction of which is equal to or smaller than a length of the perfect tooth shape portion in the axial direction, and which does not function as a gear.

Effects of the Invention

According to an aspect, it is possible to provide a pinion-equipped motor that has a shaft provided with a pinion having a perfect tooth shape portion functioning as a gear, in which to shorten the length of the pinion in the axial direction, the perfect tooth shape portion of the pinion can be offset to the proximal side of the shaft.

BRIEF DESCRIPTION OF THE DRAWINGS

FIG. 7 is a plan view illustrating a seventh embodiment of a pinion-equipped motor according to the present invention;

PREFERRED MODE FOR CARRYING OUT THE INVENTION

Figure 1:
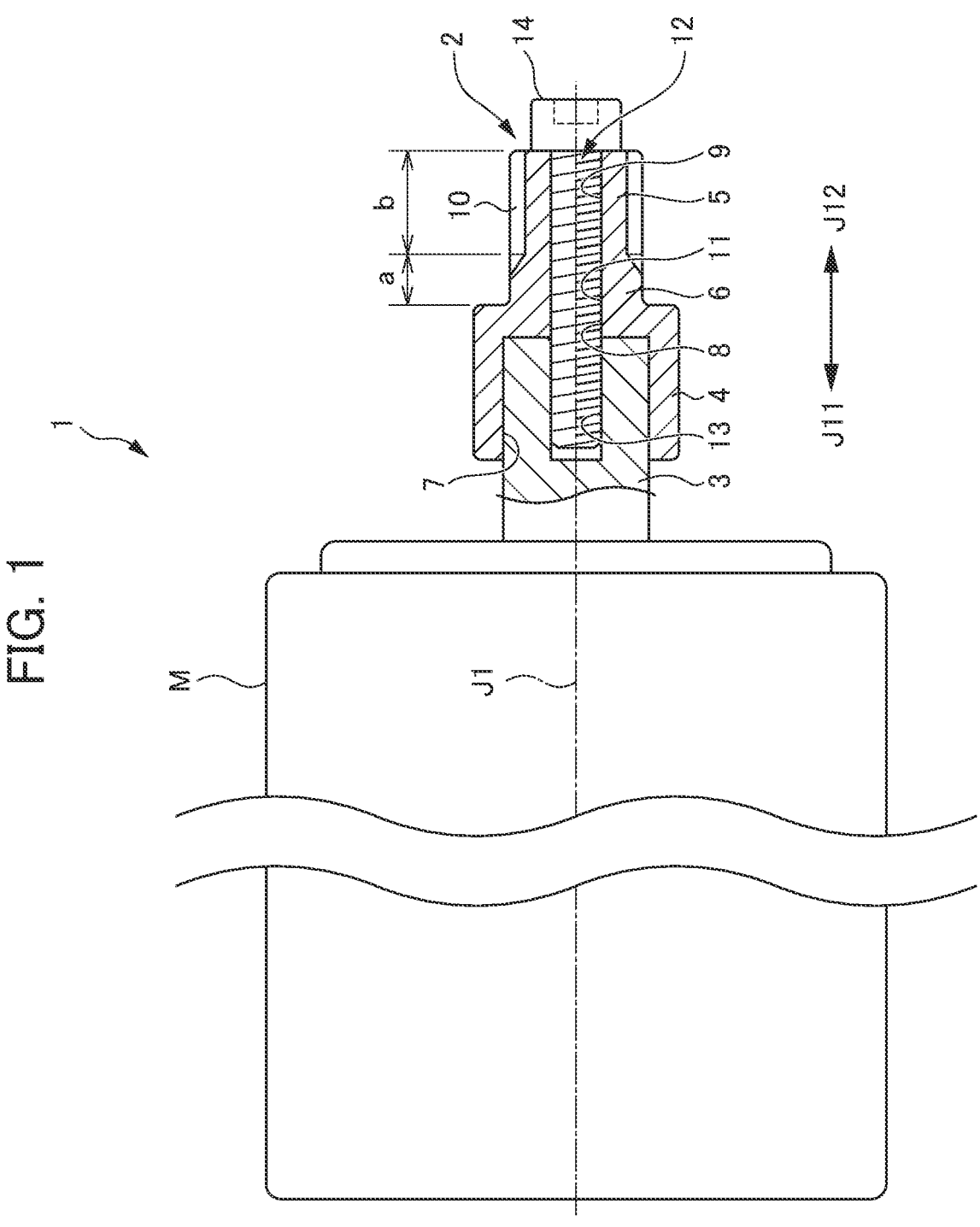
FIG. 1 is a left side view illustrating a first embodiment of a pinion-equipped motor according to the present invention and illustrates a part in a section.

Hereinafter, a pinion-equipped motor according to an aspect of the present disclosure will be described with reference to the drawings. As illustrated in FIG. 1, a pinion-equipped motor 1 according to a first embodiment has a shaft 3 provided with a pinion 2 on a distal side J12 of a motor main body M. The pinion 2 has a base portion 4 that is mounted on a shaft 3, a perfect tooth shape portion 5 that functions as a gear, and an imperfect tooth shape portion 6 that does not function as a gear. The pinion 2 has a rod shape extending along an axial direction J1 and has a diameter reduced on the distal side J12. The pinion 2 has a large-diameter portion formed by the base portion 4 and a small-diameter portion formed by the imperfect tooth shape portion 6 and the perfect tooth shape portion 5.

The base portion 4 is located on a proximal side J11 of the pinion 2. The base portion 4 has a cylindrical shape that is open on a rear side which is the proximal side J11 of the shaft 3. In other words, the base portion 4 has a circular inner hole 7 that is open on the rear side. The inner hole 7 is a shaft hole into which a distal end portion of the shaft 3 is to be inserted. A circular communication hole 8 that establishes communication between inside and outside of the base portion 4 is formed in a front wall of the base portion 4.

The perfect tooth shape portion 5 is located on the distal side J12 of the pinion 2. The perfect tooth shape portion 5 has a cylindrical shape that is open in a front-rear direction (axial direction J1). In other words, the perfect tooth shape portion 5 has an inner hole 9 that is open in the front-rear direction. A plurality of teeth 10 are provided at an outer circumferential portion of the perfect tooth shape portion 5. In this manner, the perfect tooth shape portion 5 is formed into a gear shape. The outer diameter of the perfect tooth shape portion 5 is not greater than the outer diameter of the shaft 3.

The imperfect tooth shape portion 6 is provided between the base portion 4 and the perfect tooth shape portion 5. The imperfect tooth shape portion 6 has a cylindrical shape that is open in the front-rear direction (axial direction J1). In other words, the imperfect tooth shape portion 6 has an inner hole 11 that is open in the front-rear direction. The length (the length of the imperfect tooth shape portion 6 in the axial direction) a of the imperfect tooth shape portion 6 along the axial direction J1 of the shaft 3 is not greater than the length (the length of the perfect tooth shape portion 5 in the axial direction) b of the shaft 3 of the perfect tooth shape portion 5 in the axial direction J1. Note that the imperfect tooth shape portion 6 is a part including a sweep-out portion of a tooth shape formed in the perfect tooth shape portion 5 and a perfect tooth shape is not formed in the imperfect tooth shape portion 6.

The inner hole 11 of the imperfect tooth shape portion 6 and the inner hole 9 of the perfect tooth shape portion 5 communicate with each other. The inner hole 11 of the imperfect tooth shape portion 6 and the inner hole 7 of the base portion 4 communicate with each other via the communication hole 8 formed in the front wall of the base portion 4. Therefore, the inner hole 9 of the perfect tooth shape portion 5, the inner hole 11 of the imperfect tooth shape portion 6, and the inner hole 7 of the base portion 4 continue in the front-rear direction (axial direction J1). In this manner, an insertion hole 12 that penetrates in the front-rear direction is formed at the center of the pinion 2.

The pinion 2 with such a configuration is coupled to the shaft 3 by a bolt 14 being screwed into a screw hole 13 formed in a distal end surface of the shaft 3 via the inner hole 9 of the perfect tooth shape portion 5 and the inner hole 11 of the imperfect tooth shape portion 6 in a state where the shaft 3 is inserted into the inner hole 7 of the base portion 4. In this manner, the pinion 2 is attached to the distal end portion of the shaft 3 such that the pinion 2 is rotatable integrally with the shaft 3.

In the case of the pinion-equipped motor 1 according to the first embodiment, the length a of the imperfect tooth shape portion 6 in the axial direction is shorter than the length b of the perfect tooth shape portion 5 in the axial direction on the contrary to the related art. In this manner, it is possible to offset the perfect tooth shape portion 5 on the proximal side J11 of the shaft 3 as compared with the related art in order to shorten the length of the pinion 2 in the axial direction J1. Therefore, it is possible to reduce the size of the entire motor 1 to a compact size.

Figure 2:
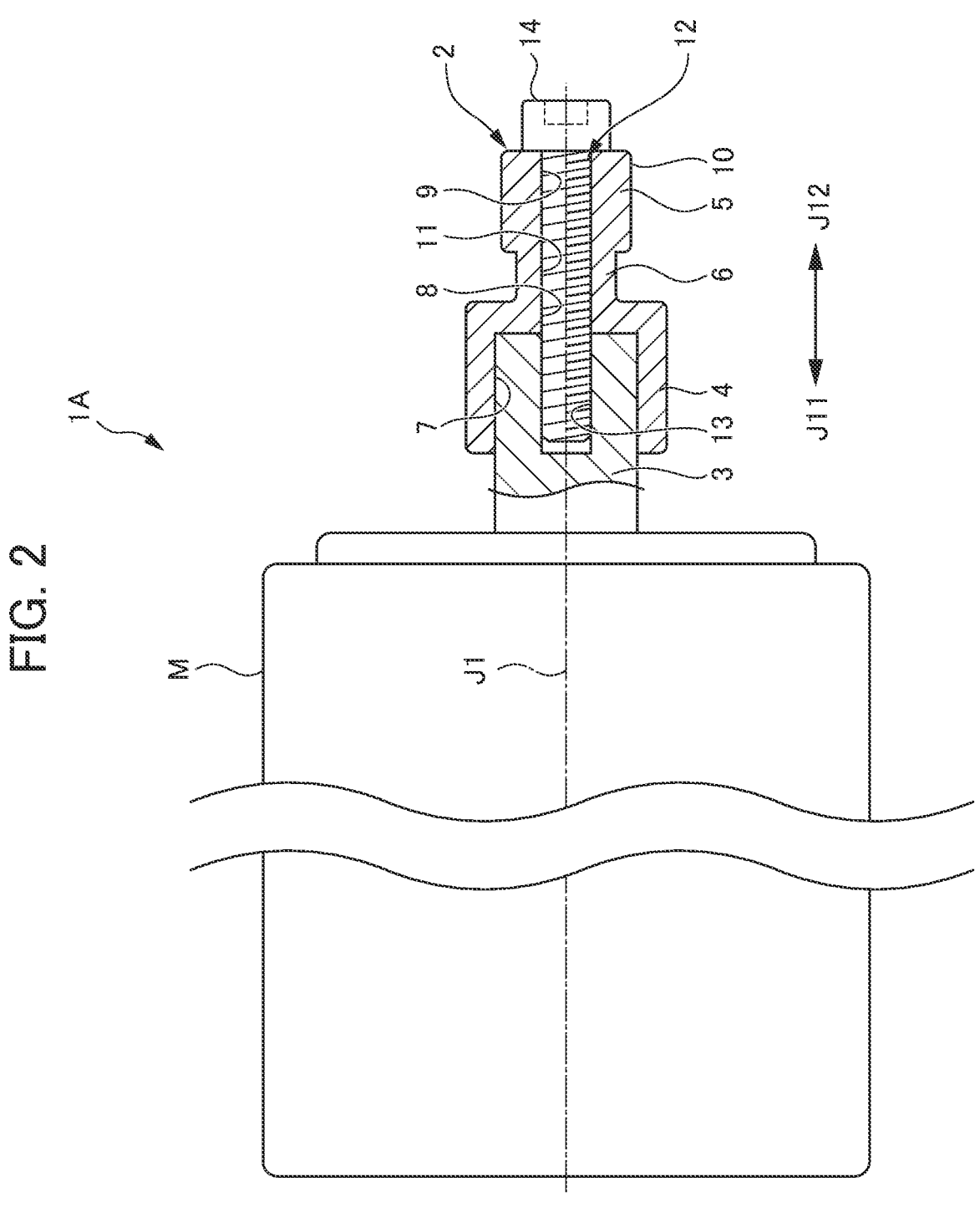
FIG. 2 is a left side view illustrating a second embodiment of a pinion-equipped motor according to the present invention and illustrates a part in a section.

Next, a second embodiment of a pinion-equipped motor according to the present invention will be described by using FIG. 2. Note that components denoted by the same reference signs as the reference signs applied in the first embodiment have the same effects and description may thus be omitted below. A pinion-equipped motor 1A according to the second embodiment is different from the first embodiment in a configuration of an imperfect tooth shape portion 6 of a pinion 2.

The pinion 2 has a reduced diameter on a rear side which is a proximal side J11 of a small-diameter portion (the imperfect tooth shape portion 6 and a perfect tooth shape portion 5). In this manner, the outer diameter of the imperfect tooth shape portion 6 is a smaller diameter than the outer diameter of the perfect tooth shape portion 5. Thus, the imperfect tooth shape portion 6 has a constricted shape with a smaller diameter than that of the perfect tooth shape portion 5.

In the case of the pinion-equipped motor 1A according to the second embodiment, the imperfect tooth shape portion 6 is formed into a constricted shape. Therefore, it is not necessary to include sweep-out when a tooth shape is formed in the perfect tooth shape portion 5, and it is possible to easily machine the tooth shape.

Figure 3:
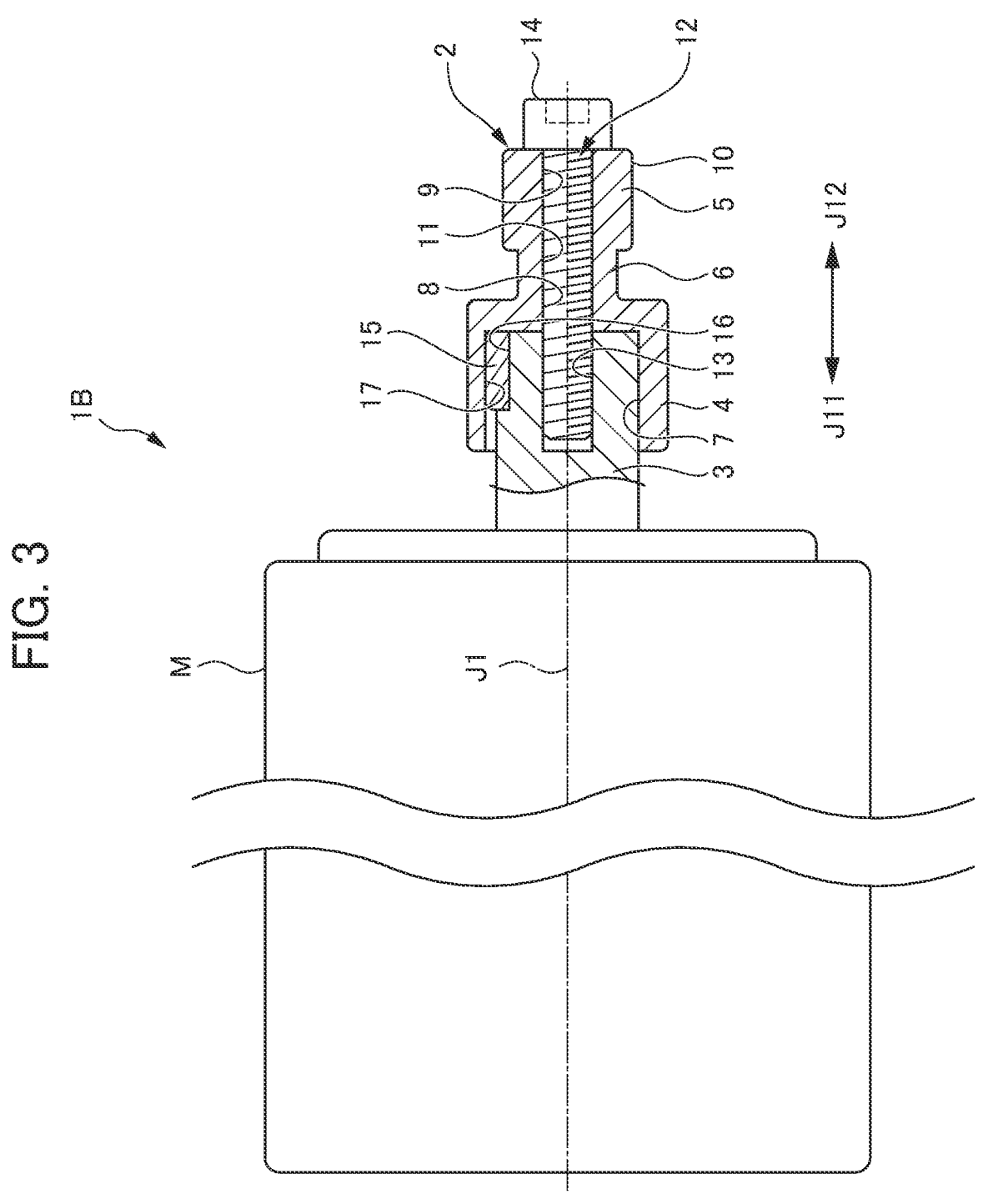
FIG. 3 is a left side view illustrating a third embodiment of a pinion-equipped motor according to the present invention and illustrates a part in a section.

Next, a third embodiment of a pinion-equipped motor according to the present invention will be described by using FIG. 3. Note that components denoted by the same reference signs as the reference signs applied in the first embodiment have the same effects and description may thus be omitted below. A pinion-equipped motor 1B according to the third embodiment is different from the first embodiment in a structure of attachment of a pinion 2 to a shaft 3. In the pinion-equipped motor 1B according to the third embodiment, an imperfect tooth shape portion 6 is formed into a constricted shape similarly to the case of the second embodiment.

In the pinion-equipped motor 1B according to the third embodiment, the pinion 2 is coupled to the shaft 3 with a bolt 14 similarly to the case of the first embodiment. Additionally, a key 15 is provided between an inner circumferential surface of a base portion 4 and an outer circumferential surface of the shaft 3. In this case, a key groove 16 into which substantially half the key 15 in a thickness direction is fitted is provided in the outer circumferential surface of the shaft 3 along an axial direction J1. On the other hand, a key groove 17 is provided in the inner circumferential surface of the base portion 4 along the axial direction J1. The key groove 17 penetrates on a rear side which is a proximal side J11. The key 15 projecting from the outer circumferential surface of the shaft 3 is fitted into the key groove 17. In this manner, the base portion 4 of the pinion 2 is externally engaged with the shaft 3 via the key 15 such that the base portion 4 is rotatable integrally with the shaft 3. Thus, the pinion 2 is rotatable integrally with the shaft 3.

In the case of the pinion-equipped motor 1B according to the third embodiment, the pinion 2 is attached to the shaft 3 via the key 15 such that the pinion 2 is rotatable integrally with the shaft 3. Therefore, it is possible to reliably prevent rotation of the pinion 2 in a circumferential direction with respect to the shaft 3 and to stably transmit power. Also, it is possible to use a standard motor as the motor 1B.

Figure 4:
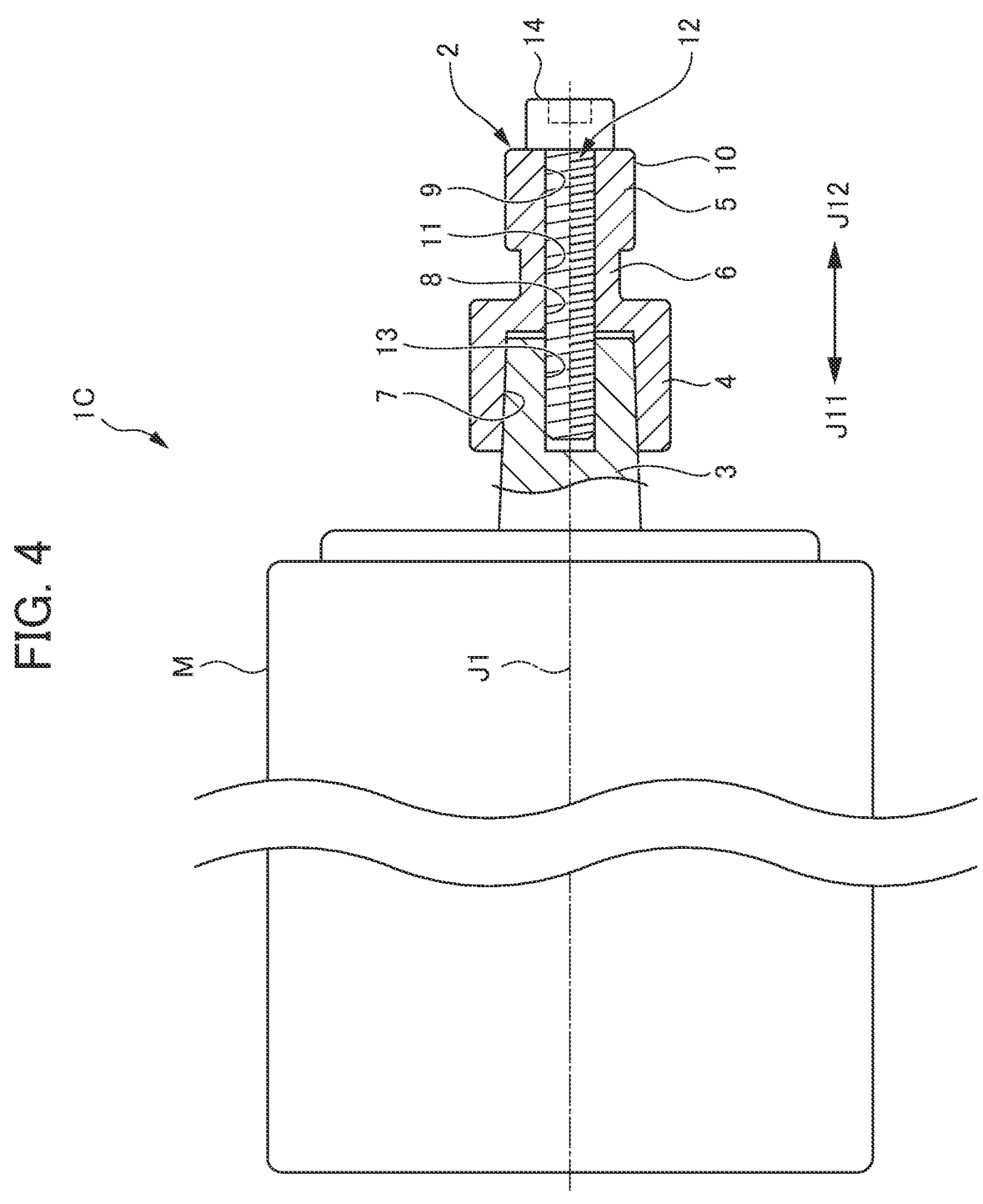
FIG. 4 is a left side view illustrating a fourth embodiment of a pinion-equipped motor according to the present invention and illustrates a part in a section.

Next, a fourth embodiment of a pinion-equipped motor according to the present invention will be described by using FIG. 4. Note that components denoted by the same reference signs as the reference signs applied in the first embodiment have the same effects and description may thus be omitted below. A pinion-equipped motor 1C according to the fourth embodiment is different from the first embodiment in a structure of attachment of a pinion 2 to a shaft 3. In the pinion-equipped motor 1C according to the fourth embodiment, an imperfect tooth shape portion 6 is formed into a constricted shape similarly to the case of the second embodiment.

In the pinion-equipped motor 1C according to the fourth embodiment, the pinion 2 is coupled to the shaft 3 with a bolt 14 similarly to the case of the first embodiment. Additionally, the pinion 2 is taper-coupled to a distal end portion of the shaft 3. Therefore, the distal end portion of the shaft 3 has a tapered shape with a diameter decreasing toward a distal side J12. In this case, the tapered distal end portion of the shaft 3 is taper-coupled by being fitted into a shaft hole 7 formed in a base portion 4 of the pinion 2. In this manner, the pinion 2 is rotatable integrally with the shaft 3.

In the case of the pinion-equipped motor 1C according to the fourth embodiment, the pinion 2 is taper-coupled to the distal end portion of the shaft 3. Therefore, it is possible to shorten the shaft 3 of the motor 1C as compared with the case of the third embodiment. In this manner, it is possible to further offset the perfect tooth shape portion 5 to the proximal side J11 of the shaft 3. Moreover, it is possible to use a standard motor as the motor 1C.

Next, a fifth embodiment of a pinion-equipped motor according to the present invention will be described by using FIG. 5. Note that components denoted by the same reference signs as the reference signs applied in the first embodiment have the same effects and description may thus be omitted below. A pinion-equipped motor 1D according to the fifth embodiment is different from the first embodiment in a configuration in surroundings of a pinion 2. In the pinion-equipped motor 1D according to the fifth embodiment, an imperfect tooth shape portion 6 is formed into a constricted shape similarly to the case of the second embodiment.

Figure 5:
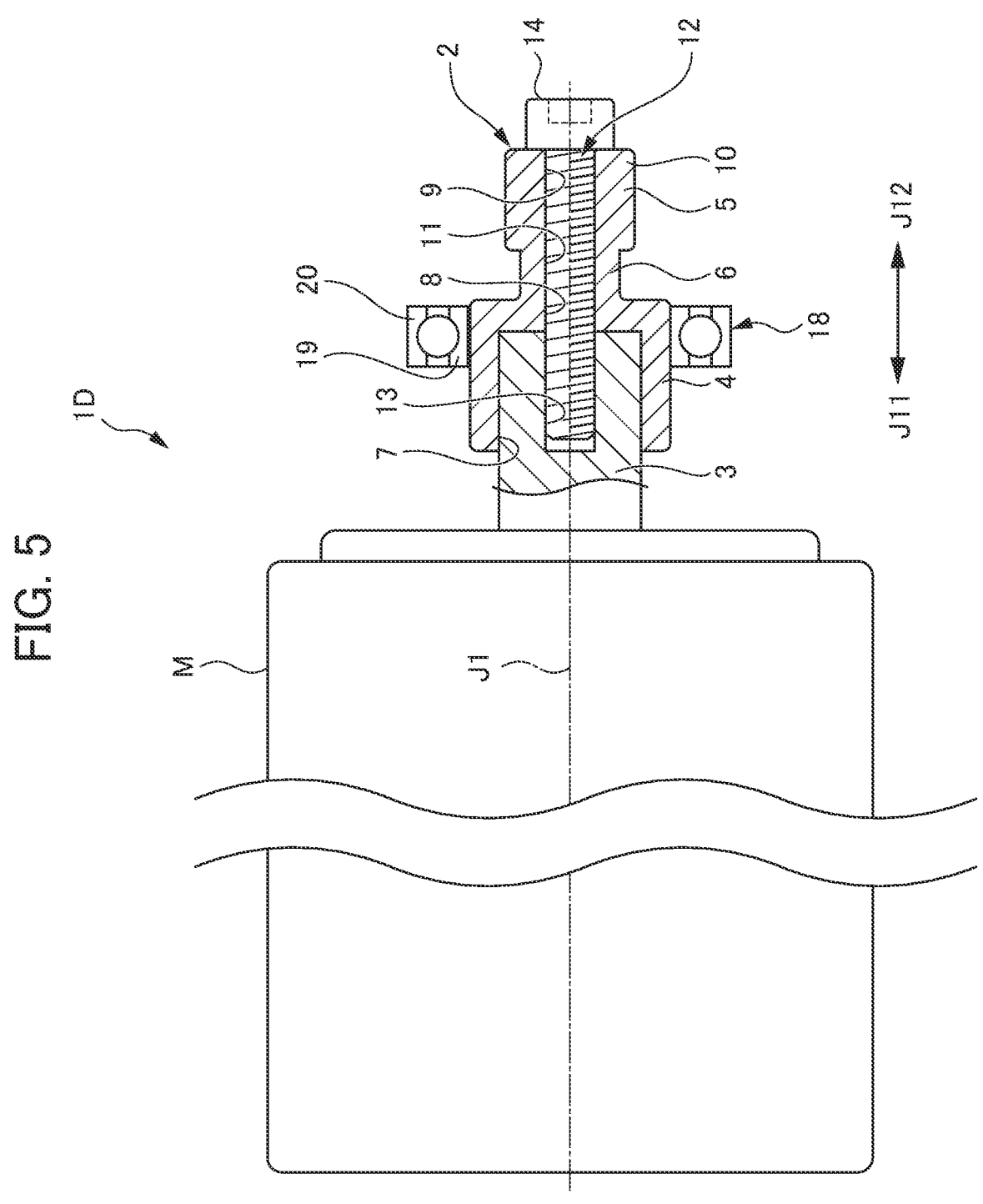
FIG. 5 is a left side view illustrating a fifth embodiment of a pinion-equipped motor according to the present invention and illustrates a part in a section.

As illustrated in FIG. 5, a bearing 18 is mounted on an outer circumferential surface of a base portion 4 of the pinion 2. Specifically, the base portion 4 of the pinion 2 is fitted into an inner ring 19 of the bearing 18 in a state where the pinion 2 penetrates through the bearing 18. In this case, an outer ring 20 of the bearing 18 is fixed to an inner surface of a casing which is not shown in the drawing and has a hollow shape where the motor 1D is accommodated.

In the case of the pinion-equipped motor 1D according to the fifth embodiment, the outer ring 20 of the bearing 18 provided at the base portion 4 is fixed to the casing. Therefore, it is possible to reduce a moment acting on the motor 1D from a perfect tooth shape portion 5 of the pinion 2. Also, it is possible to position a shaft 3 of the motor 1D with respect to the casing.

Figure 6:
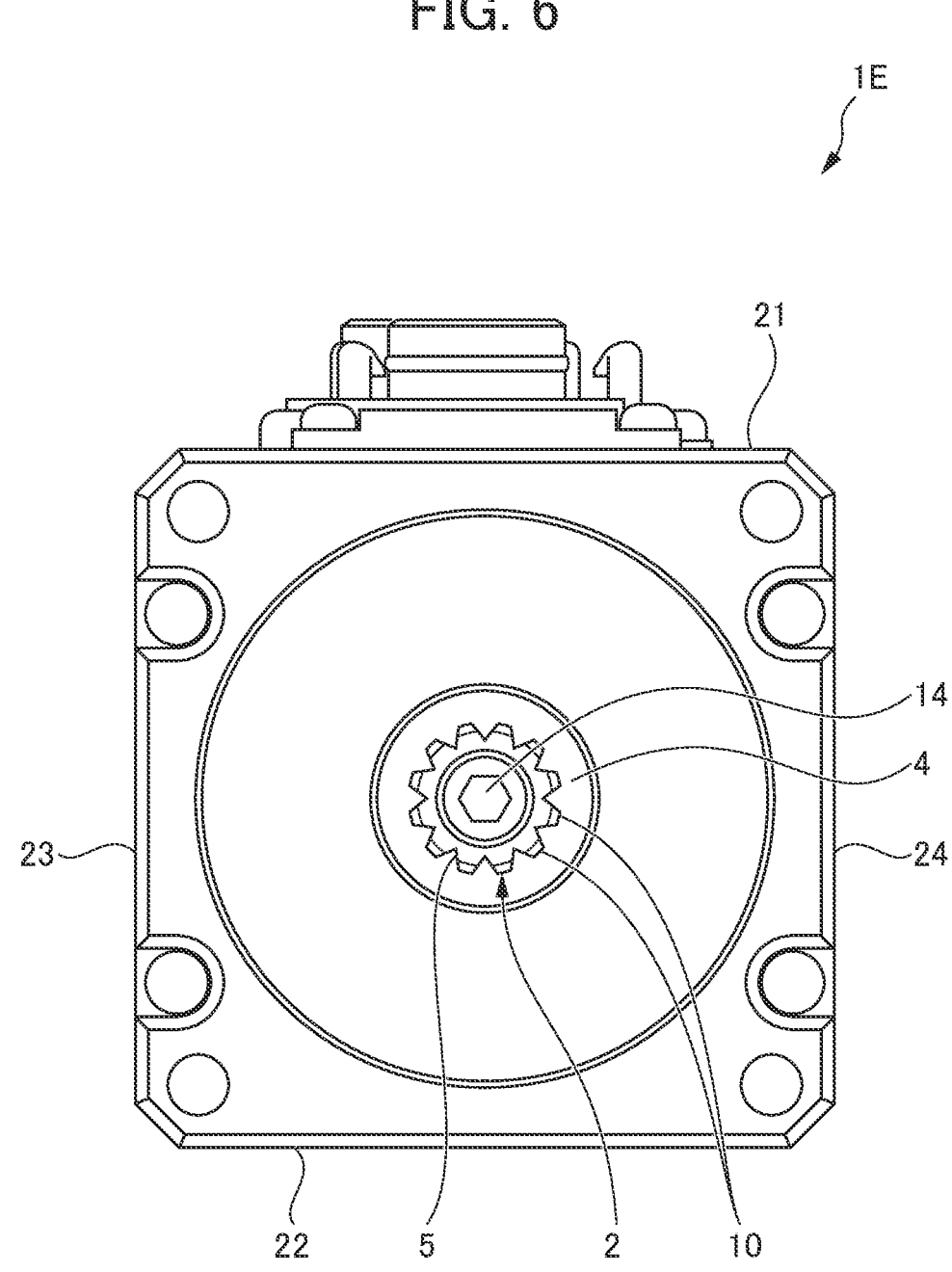
FIG. 6 is a front view illustrating a sixth embodiment of a pinion-equipped motor according to the present invention.

Next, a sixth embodiment of a pinion-equipped motor according to the present invention will be described by using FIG. 6. Note that components denoted by the same reference signs as the reference signs applied in the first embodiment have the same effects and description may thus be omitted below. A pinion-equipped motor 1E according to the sixth embodiment is different from the first embodiment in an outer shape.

Specifically, the outer shape of the motor 1E is a polygonal shape in a front view. In the illustrated example, the outer shape of the motor 1E is substantially a quadrangular shape in a front view. In other words, a main body part of the motor 1E has an upper surface 21, a lower surface 22, a left side surface 23, and a right side surface 24. In this case, a pinion 2 is taper-coupled to the shaft 3 as described above in a state where the right side surface 24 of the motor 1E and a predetermined tooth bottom of a perfect tooth shape portion 5 correspond in position to each other, for example.

In the case of the pinion-equipped motor 1E according to the sixth embodiment, taper-coupling is employed, and it is thus possible to cause one surface of the motor 1E having a polygonal shape and the predetermined tooth bottom of the perfect tooth shape portion 5 to correspond in position to each other at the time of coupling. Therefore, the perfect tooth shape portion 5 and the outer shape of the motor 1E are positioned on the basis of a phase of the perfect tooth shape portion 5 and a phase of the outer shape of the motor 1E at the time of the taper-coupling. In this case, it is possible to cause the perfect tooth shape portion 5 to be easily meshed with a counterpart gear without causing the shaft 3 to rotate.

Figure 7:
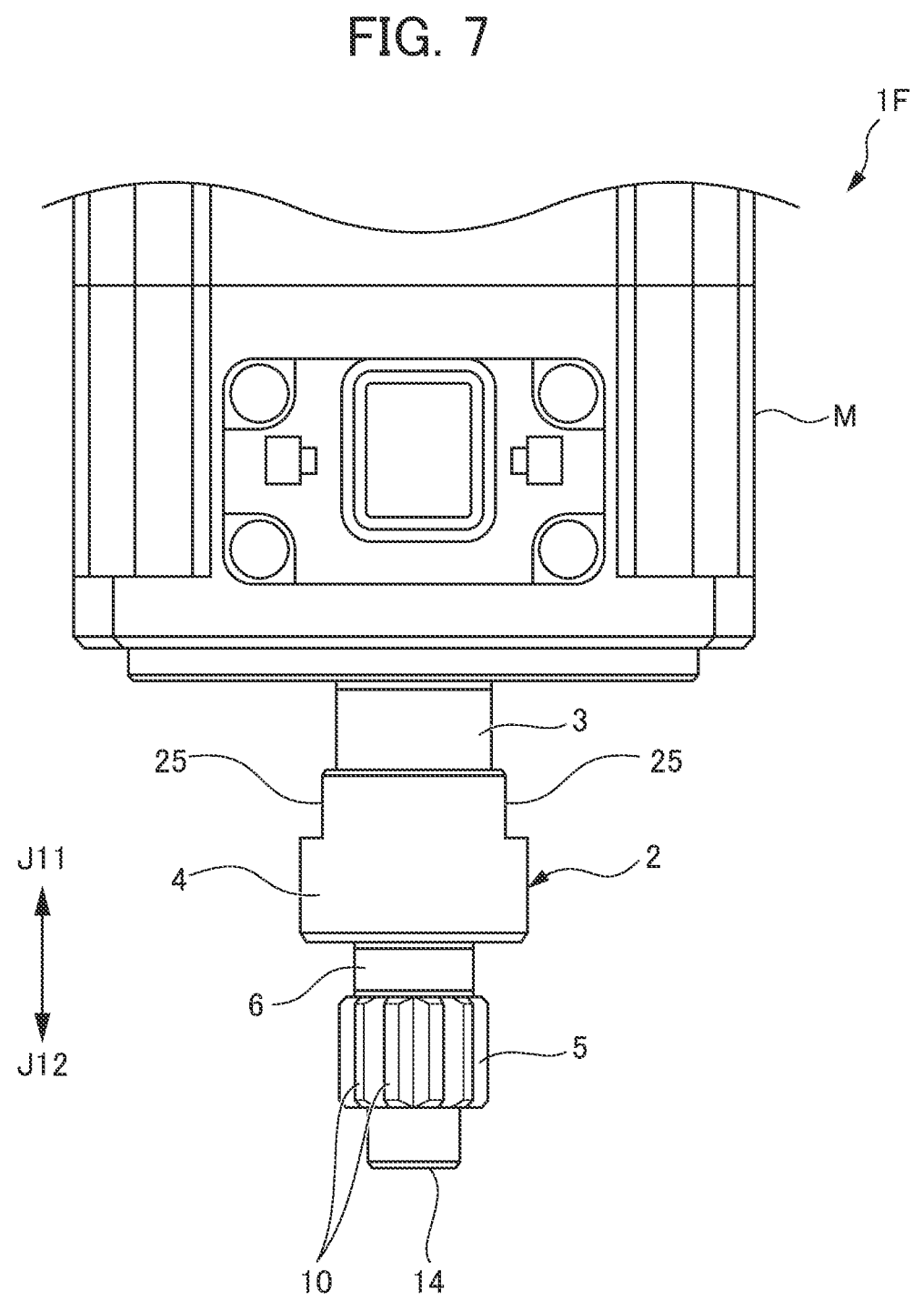

Next, a seventh embodiment of a pinion-equipped motor according to the present invention will be described by using FIG. 7. Note that components denoted by the same reference signs as the reference signs applied in the first embodiment have the same effects and description may thus be omitted below. A pinion-equipped motor 1F according to the seventh embodiment is different from the first embodiment in a configuration of a base portion 4 of a pinion 2.

Specifically, the base portion 4 of the pinion 2 has planar portions 25 on an outer circumferential surface thereof. In the illustrated example, a pair of planar portions 25 and 25 are provided at positions corresponding in a radial direction of the base portion 4 on the outer circumferential surface of the base portion 4 with a positional relationship of 180 degrees in a circumferential direction. The pair of planar portions 25 and 25 are parts that are gripped when a bolt 14 is screwed into a screw hole 13 in a distal end surface of a shaft 3 via an insertion hole 12 formed in the pinion 2.

In the case of the pinion-equipped motor 1F according to the seventh embodiment, the planar portions 25 gripped when the pinion 2 is coupled to the shaft 3 with the bolt 14 are provided in the outer circumferential surface of the base portion 4. Therefore, it is possible to prevent the pinion 2 from rotating in the circumferential direction with respect to the shaft 3 by gripping the planar portions 25 when the pinion 2 is coupled to the shaft 3 with the bolt 14. In this manner, it is possible to automatically assemble the pinion 2 with the shaft 3 by using a robot.

Next, a form of use of the pinion-equipped motor according to the present invention will be described by using FIGS. 8A and 8B. Here, a case where an articulated robot is driven by two pinion-equipped motors will be described. In this case, two gear mechanisms including the pinion-equipped motors and deceleration devices are provided at an arm of the robot. In other words, a gear mechanism 26 including a first motor 28 that is a pinion-equipped motor and a first deceleration device 29 and a gear mechanism 27 including a second motor 30 that is a pinion-equipped motor and a second deceleration device 31 are provided inside a casing 32 configuring the arm.

The first motor 28 is provided inside the casing 32 with a hollow shape. At this time, a bearing 18 provided on an outer circumferential surface of a base portion 4 is fixed to an inner surface of the casing 32. The second motor 30 is also provided in the arm similarly to the first motor 28. Specifically, the second motor 30 is provided inside the casing 32 in a state where the bearing 18 provided on the outer circumferential surface of the base portion 4 is fixed to the inner surface of the casing 32. At this time, a shaft 3 of the first motor 28 and a shaft 3 of the second motor 30 are disposed to be parallel with each other. In this manner, the first motor 28 and the second motor 30 are provided inside the arm of the robot such that the shafts 3 are rotatable.

The first deceleration device 29 has a configuration known in the related art and is configured by, for example, a hypoid gear set having a first drive shaft 33 that has a pinion gear which is not shown and is driven by the first motor 28 and a ring gear which is not shown and is meshed with the pinion gear. The first drive shaft 33 is disposed with an axial direction J2 following the front-rear direction such that the first drive shaft 33 is disposed to be parallel with the shaft 3 extending in an axial direction J1 of the first motor 28. The pinion gear is provided at a front end portion (on the side of J22) of the first drive shaft 33 such that the pinion gear is rotatable integrally therewith. A spur gear 34 is provided at a rear end portion (on the side of J21) of the first drive shaft 33 such that the spur gear 34 is rotatable integrally therewith. The spur gear 34 is meshed with the perfect tooth shape portion 5 of the first motor 28.

Figure 8A:
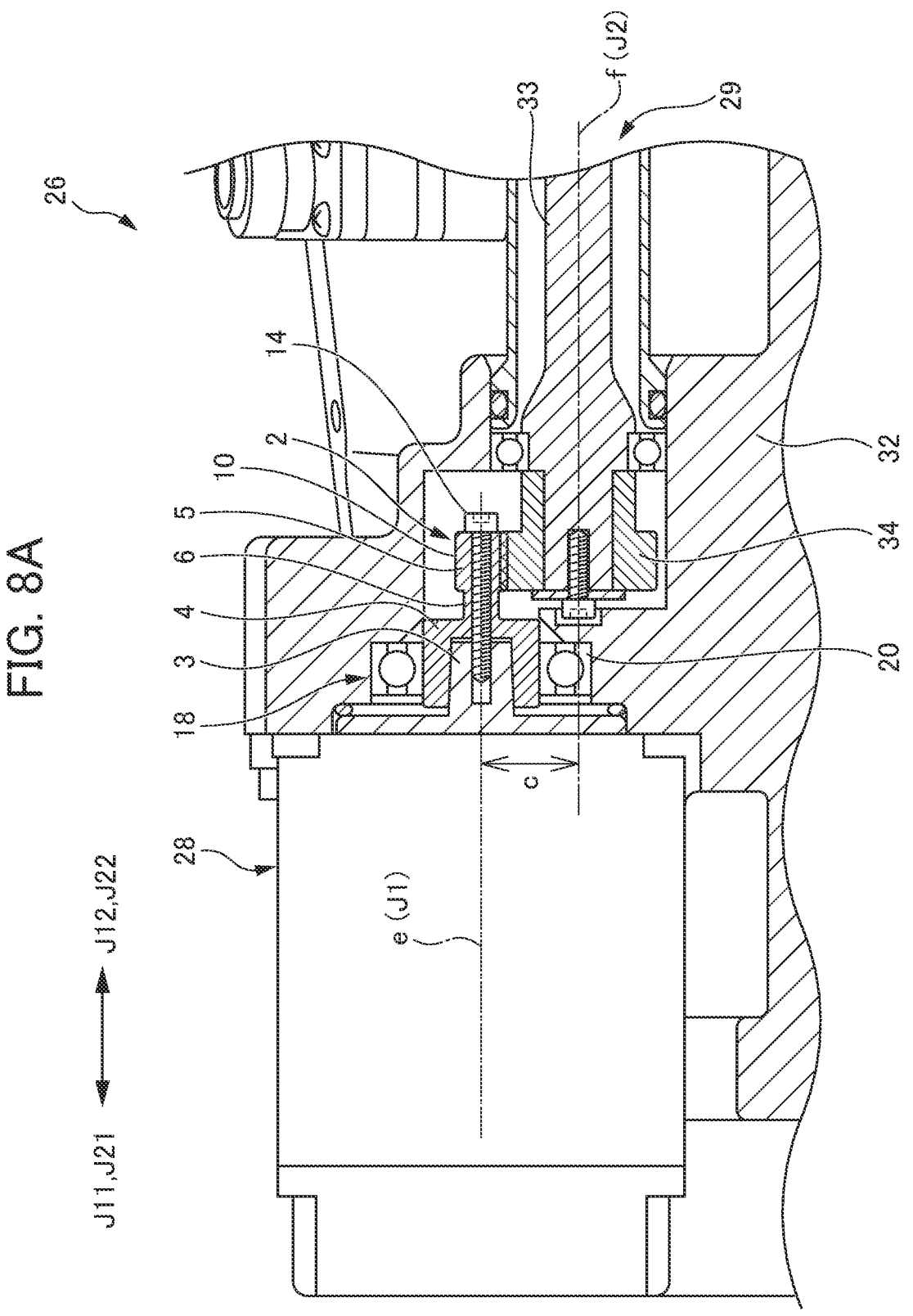
FIG. 8A is an explanatory diagram illustrating an embodiment of a gear mechanism including a pinion-equipped motor according to the present invention and illustrates an attachment part of a first motor.

As illustrated in FIG. 8A, the first motor 28 is fixed to the casing 32 in a state where positioning has been performed such that an inter-axis distance c between a counterpart gear 34 meshed with the perfect tooth shape portion 5 of the pinion 2 and the shaft 3 is equal to a predetermined distance. Here the inter-axis distance c is a distance between an axis e of the shaft 3 of the first motor 28 and an axis f of the gear 34.

The second deceleration device 31 has a configuration similar to that of the first deceleration device 29. The second deceleration device 31 has a configuration known in the related art and is configured by, for example, a hypoid gear set including a second drive shaft 35 that has a pinion gear which is not shown and is driven by the second motor 30 and a ring gear which is not shown and is meshed with the pinion gear. The second drive shaft 35 is disposed with an axial direction J3 following the front-rear direction such that the second drive shaft 35 is disposed to be parallel with the shaft 3 extending in the axial direction J1 of the second motor 30. The pinion gear is provided at a front end portion (on the side of J32) of the second drive shaft 35 such that the pinion gear is rotatable integrally therewith. A spur gear 36 is provided at a rear end portion (on the side of J31) of the second drive shaft 35 such that the spur gear 36 is rotatable integrally therewith. The spur gear 36 is meshed with the perfect tooth shape portion 5 of the second motor 30.

Figure 8B:
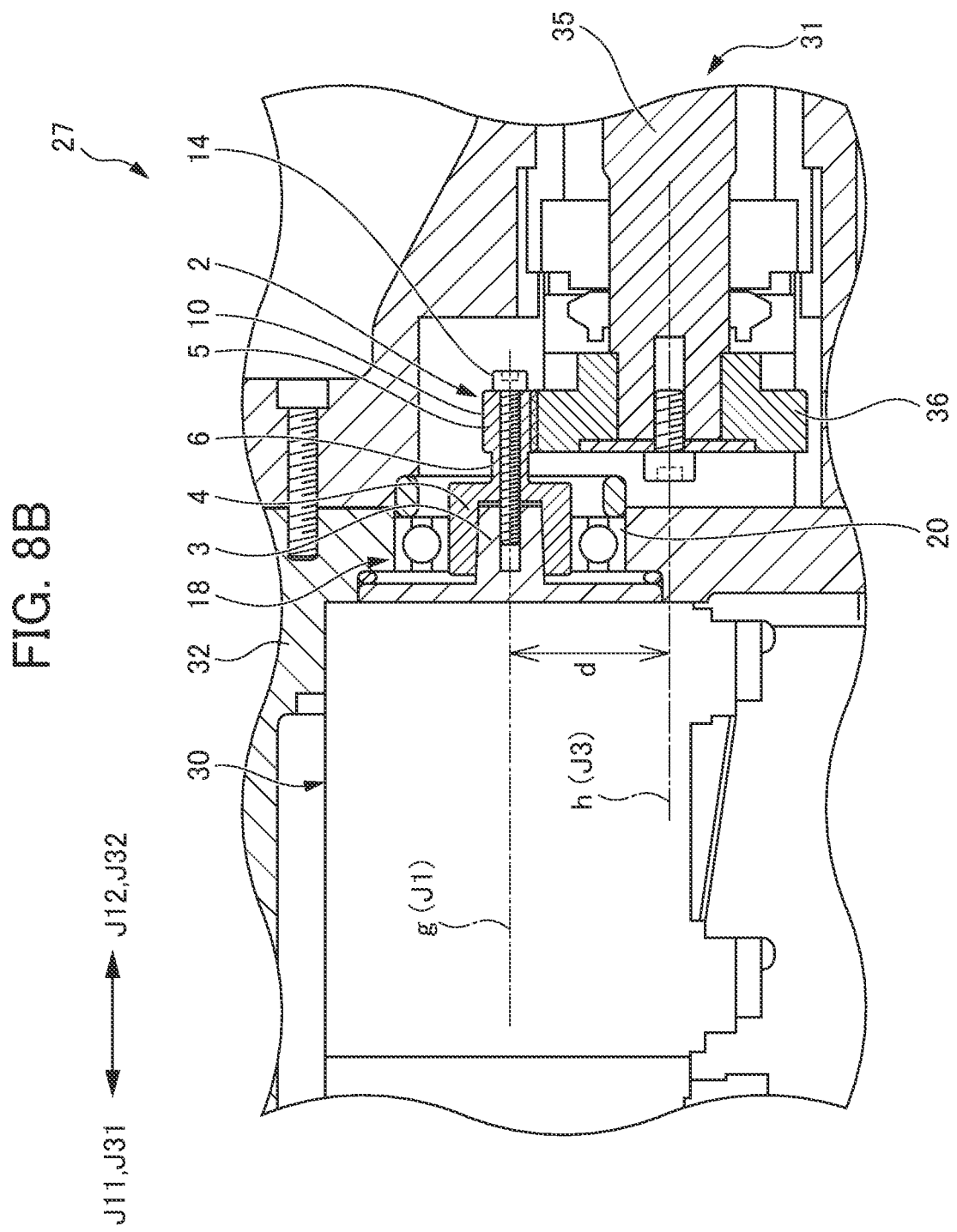
FIG. 8B is an explanatory diagram illustrating the gear mechanism according to the embodiment in FIG. 8A and illustrates an attachment part of a second motor.

As illustrated in FIG. 8B, the second motor 30 is fixed to the casing 32 in a state where positioning has been performed such that an inter-axis distance d between a counterpart gear 36 meshed with the perfect tooth shape portion 5 of the pinion 2 and the shaft 3 is equal to a predetermined distance. Here, the inter-axis distance d is a distance between an axis g of the shaft 3 of the second motor 30 and an axis h of the gear 36.

In the related art, a wrist arm length is elongated in order to store the motor provided with a pinion which is long in the axial direction inside a wrist arm. Furthermore, in order to enable the pinion-equipped motor to be detached from the robot, it is necessary to secure an excess space on a side opposite to a side of the motor on which the pinion is attached, which also leads to an increase in wrist arm length. In this case, the inertia of the robot increases, and it is thus necessary to limit operating performance. On the contrary, the length of the pinion 2 in the axial direction is short in the case of the present embodiment, it is thus not necessary to unnecessarily elongate the wrist arm length, and it is thus possible to enhance the operating performance.

Also, since the pinion of the pinion-equipped motor is long in the front-rear direction in the related art, the pinion may be bent when the motor is attached to the arm. In this case, the pinion-equipped motor is attached to the arm while the position thereof is adjusted. On the contrary, the length of the pinion 2 in the front-rear direction is shorter in the case of the gear mechanisms 26 and 27 in the present embodiment than that in the related art, and it is thus possible to attach the pinion-equipped motors 28 and 30 to the casing 32 without performing adjustment to achieve positions for a correct inter-axis distance. Also, since it is possible to reduce the bending of the pinion 2 in the case of the present embodiment, it is possible to reduce gear inclination during an operation. In this manner, it is possible to curb strange noise, unevenness of rotation, tooth friction, and the like.

Note that the present invention is not limited to each embodiment, and modifications and improvements within a range in which the object of the present invention can be achieved are included in the present invention.

A first modification example of the pinion-equipped motor according to the present invention will be described by using FIG. 9. Note that components denoted by the same reference signs as the reference signs applied in the first embodiment have the same effects and description may thus be omitted below. A pinion-equipped motor 1G according to the first modification is different from the first embodiment in the configuration of the perfect tooth shape portion 5 of the pinion 2. In the pinion-equipped motor 1G according to the first modification example, the imperfect tooth shape portion 6 is formed into a constricted shape similarly to the case of the second embodiment. Also, the pinion 2 is coupled to the shaft 3 through taper coupling similarly to the case of the fourth embodiment.

Figure 9:
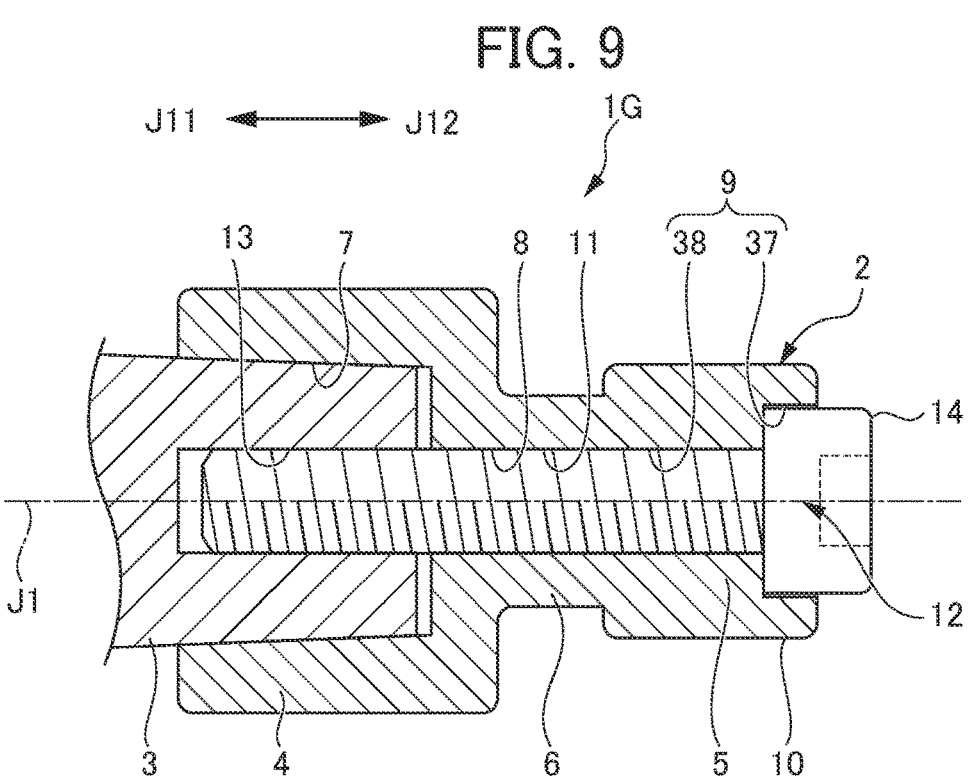
FIG. 9 is a side view vertical sectional view illustrating a first modification example of the pinion-equipped motor according to the present invention and illustrates a part in an enlarged manner.

As illustrated in FIG. 9, the inner hole 9 of the perfect tooth shape portion 5 of the pinion 2 is a stepped hole, a large-diameter hole 37 is located on the front side (on the side of J12), and a small-diameter hole 38 is located on the rear side (on the side of J11). In the illustrated example, the length of the large-diameter hole 37 in the front-rear direction (the axial direction J1) is shorter than the front-rear length of a head portion of the bolt 14. With such a configuration, a part of the head portion of the bolt 14 is accommodated inside the large-diameter hole 37 in a state where the bolt 14 is screwed into the shaft 3 via the pinion 2.

In the case of the pinion-equipped motor 1G according to the first modification example, the large-diameter hole 37 of the perfect tooth shape portion 5 is a counterbored hole. Therefore, it is possible to reduce projection of the bolt head portion on the front side (on the side of J12) and to offset the bolt head portion on the rear side (on the side of J11).

A second modification example of the pinion-equipped motor according to the present invention will be described by using FIG. 10. Note that components denoted by the same reference signs as the reference signs applied in the first embodiment have the same effects and description may thus be omitted below. A pinion-equipped motor 1H according to the second modification example is different from the first embodiment in the configuration of the perfect tooth shape portion 5 of the pinion 2. In the pinion-equipped motor 1H according to the second modification example, the imperfect tooth shape portion 6 is formed into a constricted shape similarly to the case of the second embodiment.

Figure 10:
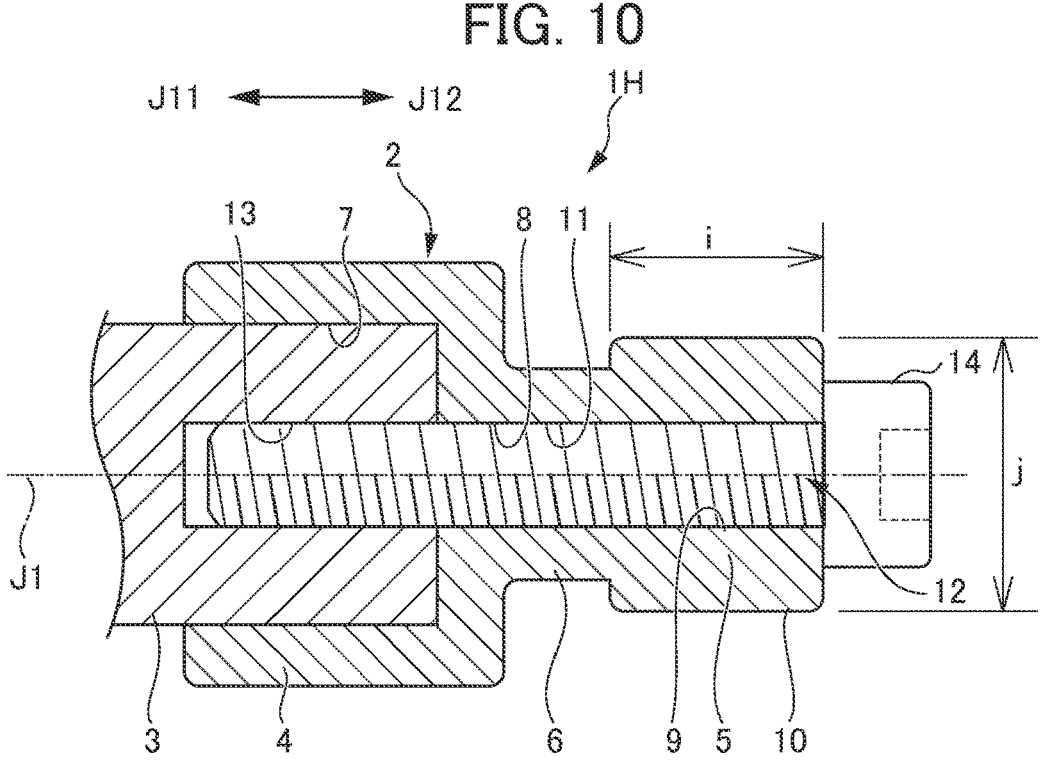
FIG. 10 is a side view vertical sectional view illustrating a second modification example of the pinion-equipped motor according to the present invention and illustrates a part in an enlarged manner.

As illustrated in FIG. 10, a length i of the perfect tooth shape portion 5 in the axial direction is not greater than an outer diameter j of the perfect tooth shape portion 5. Therefore, according to the pinion-equipped motor 1H in the second modification example, it is possible to further offset the perfect tooth shape portion 5 on the proximal side J11 of the shaft 3.

EXPLANATION OF REFERENCE NUMERALS

1 Pinion-equipped motor
2 Pinion
3 Shaft
4 Base portion
5 Perfect tooth shape portion
6 Imperfect tooth shape portion 7 Inner hole (shaft hole)
12 Insertion hole
13 Screw hole
14 Bolt
15 Key
18 Bearing
20 Outer ring
25 Planar portion
26 Gear mechanism
27 Gear mechanism
28 First motor
30 Second motor
32 Casing
34 Spur gear
36 Spur gear

The invention claimed is:

1. A pinion-equipped motor comprising: a shaft provided with a pinion at a distal end portion, the pinion including a base portion that is mounted on the shaft, a perfect tooth shape portion that has an outer diameter not greater than an outer diameter of the shaft and functions as a gear, and an imperfect tooth shape portion that is provided between the base portion and the perfect tooth shape portion, wherein a length of the imperfect tooth shape portion in an axial direction of the shaft is not greater than a length of the perfect tooth shape portion in the axial direction, and wherein the imperfect tooth shape portion does not function as a gear, wherein the base portion has, on an outer circumferential surface, a planar portion that is gripped when a bolt is screwed into a distal end surface of the shaft via an insertion hole formed in the pinion.

2. The pinion-equipped motor according to claim 1, wherein the imperfect tooth shape portion has a constricted shape having a smaller diameter than the outer diameter of the perfect tooth shape portion.

3. The pinion-equipped motor according to claim 1, wherein the base portion is externally engaged with the shaft via a key such that the base portion is rotatable integrally with the shaft.

4. The pinion-equipped motor according to claim 1, wherein a distal end portion of the shaft has a tapered shape having a diameter decreasing toward a distal side, and the distal end portion of the shaft is fitted into a shaft hole formed in the base portion, whereby the distal end portion of the shaft is taper-coupled to the base portion.

5. The pinion-equipped motor according to claim 1, wherein a bearing is mounted on an outer circumferential surface of the base portion, and an outer ring of the bearing is positioned by being fixed to an inner surface of a casing having a hollow shape.

6. A gear mechanism comprising: the pinion-equipped motor according to claim 1, wherein the pinion-equipped motor is fixed to a casing in a state where the pinion-equipped motor is positioned such that an inter-axis distance between a counterpart-side gear that is meshed with the perfect tooth shape portion and the shaft is equal to a predetermined distance.

* * * * *